United States Patent [19]

Brooke

[11] 4,196,455
[45] Apr. 1, 1980

[54] COPYING MACHINE WITH CONSTANT LENGTH SCANNING BEAM

[75] Inventor: Edric R. Brooke, Milton Keynes, England

[73] Assignee: Xerox Corporation, Stamford, Conn.

[21] Appl. No.: 948,360

[22] Filed: Oct. 4, 1978

[30] Foreign Application Priority Data

Oct. 5, 1977 [GB] United Kingdom ............... 41306/77
Nov. 29, 1977 [GB] United Kingdom ............... 49523/77

[51] Int. Cl.² .......................... H04N 1/10; H04N 1/04
[52] U.S. Cl. ........................................ 358/296; 355/8; 358/285; 365/234
[58] Field of Search ............... 365/120, 127, 215, 234; 358/285, 286, 287, 288, 289, 290, 291, 292, 293, 294, 295, 296, 302; 355/8; 179/100.3 V

[56] References Cited

U.S. PATENT DOCUMENTS

| 2,319,898 | 5/1943 | Zurian | 358/294 |
| 3,800,076 | 3/1974 | Koizumi | 358/286 |
| 3,867,569 | 2/1975 | Watson | 358/294 |
| 3,944,726 | 3/1976 | Ito | 358/280 |

Primary Examiner—Stuart N. Hecker

[57] ABSTRACT

A copying machine is provided for reproduction of a stationary original by progressively scanning a surface of the original and directing a scanning beam on to a photosensitive device which either generates an image of the original or an electric signal representing that image. A photosensitive device is mounted on the carriage and the beam is reflected back and forth in parallel with the surface such that the overall length of the scanning beam remains constant during scanning.

5 Claims, 2 Drawing Figures

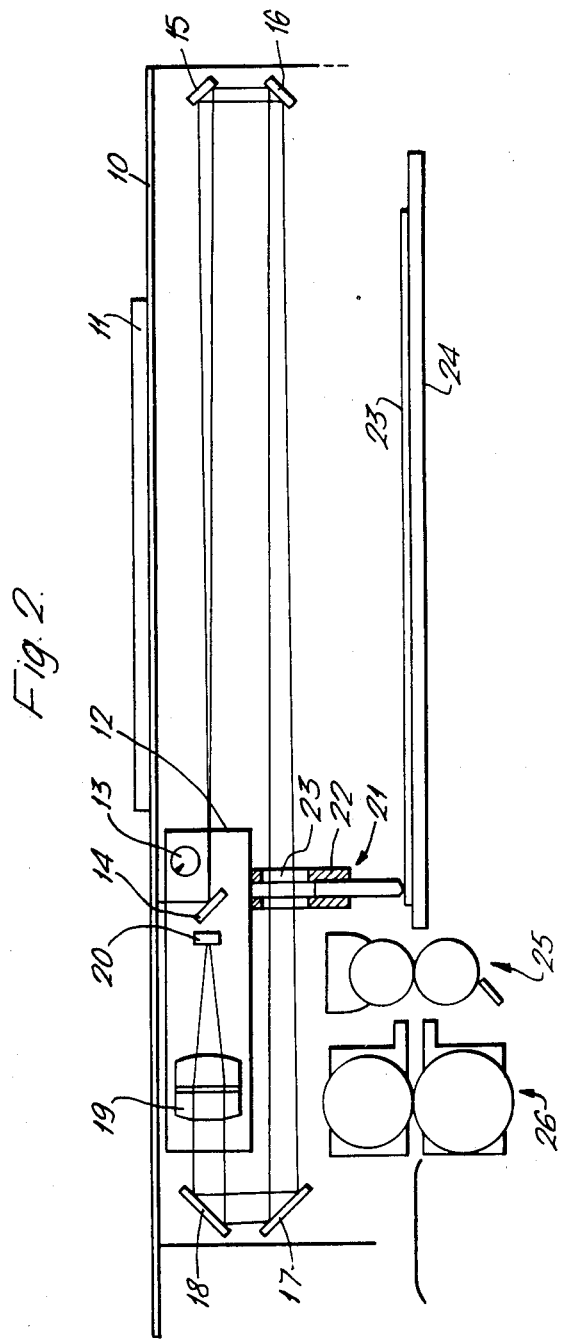

COPYING MACHINE WITH CONSTANT LENGTH SCANNING BEAM

BACKGROUND OF THE INVENTION

The invention relates to copying machines.

In copying machines it is usually preferred to provide a platen to support an original to be copied in which the original and platen remain stationary during a copying sequence. One conventional method of forming an image of the original is to provide a scanning operation for progressively illuminating and transmitting images of strips of the original on to a photosensitive device. The present invention relates to copying machines including such scanning arrangements.

SUMMARY OF THE INVENTION

According to the invention there is provided a copying machine for reproduction of a stationary original by progressively scanning a surface of the original and directing a scanning beam on to a photosensitive device which either generates an image of the original or an electric signal representing that image and have a scanning carriage movable parallel to said surface the improvement comprising photosensitive device and light source mounting means on said carriage, and first reflecting surface means on said carriage, first reflecting means mounted on said carriage arranged to direct said beam away from said photosensitive device and parallel to said surface, second reflecting means mounted on said machine arranged to return said beam parallel to said surface to a remote position beyond said photosensitive device, and third reflecting means mounted on said machine at said remote position to direct said beam along a path parallel to said surface towards said photosensitive device, such that during scanning the overall length of the scanning beam remains constant.

BRIEF DESCRIPTION OF THE DRAWINGS

Copying machines according to the invention will now be described by way of example with reference to the accompanying schematic drawings in which FIGS. 1 and 2 show similar machines.

DETAILED DESCRIPTION OF INVENTION

Figure 1:
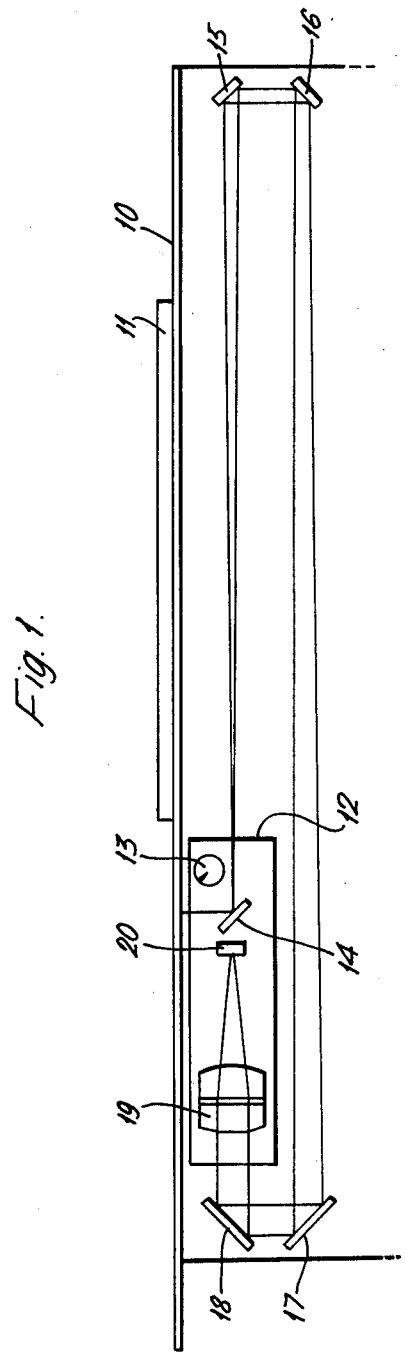

Referring to the drawings, in FIG. 1 a copying machine includes a platen 10 on which an original 11 to be copied is placed in use. A scan carriage 12, shown in a start-of-scan position, is mounted under the platen 10 for movement parallel to the surface of the platen 10 past the document 11. An illuminator 13 which is arranged to illuminate a strip of the original 11 is mounted on the carriage 12.

Images of the successive strips of the original 11 are formed and, as the carriage 12 moves along the original, are projected in the form of a scanning beam at right angles to the platen 10. The beam is turned through 90° by a strip mirror 14 mounted on the carriage 12 towards a pair of mirrors 15 and 16. The mirrors 15 and 16 direct the scanning beam parallel to the surface of the platen 10 and under the carriage 12. A further pair of mirrors, 17 and 18, are provided to turn the beam through a further 180° and direct the beam through a lens 19 (along a line parallel to the surface of the platen 10) on to an image forming device 20.

Thus with the scanning beam following a path as described, the scanning beam length remains constant during movement of the carriage 12. This is because any change in distance due to scanning movement between the mirrors 14 and 15 exactly compensates for changes in the distance between the mirror 18 and lens 19.

So far as the present invention is concerned it will be appreciated that other scanning beam routes can be used provided one part of the beam which diminishes as the carriage moves in one direction is matched by another part that increases to maintain the objective distance of the lens constant. In the configuration described above and shown in the drawing, the scanning beam must essentially include parts as arranged, which are parallel to the direction of scanning but not necessarily colinear, consisting of the one part from the mirror 14 to the mirror 15 and the other part mirror 18 to lens 19. The actual beam distances of these two parts can of course be altered independently. How the scanning beam is transmitted between mirrors 15 and 18 is inconsequential in achieving a constant scanning beam overall length so that in carrying out the invention the parts between mirrors 15 and 18 may take any path. For convenience in setting up for example the overall beam route shown is regarded as generally satisfactory. As few active components as possible are preferred for low cost and transmission efficiency. It will be noted however if the carriage protrudes too far below the surface of the platen it may be convenient to route the scanning beam around the carriage rather than underneath the carriage as shown.

In the copying machine described the image forming device comprises a charge coupled device (CCD) array. Each CCD responds to the intensity of light it receives to provide a corresponding electric signal or condition. There are very many known ways of sensing and gathering such electric signals from CCD arrays, such methods form no part of the present invention. In the example described, we use a 1728 element CCD array which has a cell size of about 8 microns. The lens has a reduction of around 8 : 1 to focus the scanning beam on to the CCD array 20.

The successive images formed at the array 20, representing lines of the original 11, are transmitted to a development station (not shown) which may be an integral part of the described machine. The development station may however be placed if desired at a location remote from the CCD array 20. In one arrangement for example, the signals from the CCD array 20 are collected and transmitted in raster scan code along telephone lines to a development station at another office location. In yet another arrangement the signals collected from the CCD array 20 are stored in a core store for later application to a development station.

The CCD array by its nature must be interrogated as succesive line images are formed so that successive combinations of electric signals representing each line can be collected and used to control a local development station, or be transmitted, or be stored as the case may be. We arrange in one embodiment for the interrogation to be electrically controlled as an intermittent gathering from (and resetting of) each CCD of the array 20 as the carriage 12 moves steadily across the original 11. In another arrangement we arrange to move the carriage in discrete steps to scan the original and to interrogate the CCD array correspondingly once for each step of said carriage before the carriage moves on to the next step.

In the present example the lens 19 has a reduction of 8 : 1. This is to match the readily available CCD arrays to the average width of originals to be copied. It will be appreciated that other lens reductions can be incorporated in carrying out the invention. In this context, it will also be appreciated that an image forming device as wide as the original is not available nor is it believed ever likely to be available for use in copying machines at suitable cost. If such a device were available then the scanning beam could be directed by the lens 14 directly at such an imaging forming device.

The imaging forming device 20 may comprise a non-electrical device. In one arrangement we use a photographic film. The film is supported on a spool and exposed in successive strips. Movement of the film over the spool being in synchronism with movement of the carriage 12. Such an arrangement is conveniently used to form microfiche copies of the original.

The problem, which is resolved by the present invention in copying machines having scanning systems, is well known. That problem is the maintaining of the scanning beam length or objective distance constant. Earlier, and much used solutions, consisted of having two moving mirrors generally facing one another and arranged to move such that one mirror moves at half the speed of the other mirror during scanning; this is often referred to as a "half speed moving mirror system" and is described fully in U.K. Pat. No. 1,089,072. A difficulty with such systems is the requirement of moving two masses, the mirrors and their mountings, in synchronism at the correct relative speeds. The present invention provides an improvement in that only one mass is required to be moved, the carriage 12. Further, synchronism of the two mirrors was far from easy, especially where as is usually the case in copying machines, high acceleration forces are involved to ensure high copy rates are achieved. Additionally, the stepwise movement of the carriage mentioned above, as one method of interrupting scanning to reset the CCD array, also presents very serious difficulties with a half speed moving mirror system, and greatly aggravates the problem of synchronising movements of the two masses at different speeds.

If FIG. 2, the copying machine is the same as the machine of FIG. 1, but there is added a stylus printing head 21, which is electrically coupled to the image forming device 20, supported on the under surface of the carriage 12 by a bracket 22. An aperture 23 is provided in the bracket 22 for the optical beam between the mirrors 16 and 17. The head 21 is urged against a dielectric coated record medium 23 supported on a conducting backing plate 24 and extending parallel to and under the platen 10.

The copying machine of FIG. 2 also includes a developer station 25 and a fuser station 26 for processing the record medium 23 after a pass of the printing head 21. Details of the record medium handling system are not shown as they are or can be of generally well-known types. Although it will be appreciated that the record medium 23 must not be engaged on its top surface or that part of its top surface in which the latent image is formed by the printing head 21.

It will be appreciated that whereas the printing head 21 as described forms an image which is later developed and fused, the head 21 could be of the type which forms a visual image directly such as for example, an ink-jet printing head or a resistive printing stylus head.

What is claimed is:

1. In a copying machine for reproduction of a stationary original by progressively scanning a surface of the original and directing a scanning beam on to a photosensitive device which either generates an image of the original or an electric signal representing that image and having a scanning carriage movable parallel to said surface the improvement comprising photosensitive device and light source mounting means on said carriage, and first reflecting surface means on said carriage, first reflecting means mounted on said carriage arranged to direct said beam away from said photosensitive device and parallel to said surface, second reflecting means mounted on said machine arranged to return said beam parallel to said surface to a remote position beyond said photosensitive device, and third reflecting means mounted on said machine at said remote position to direct said beam along a path parallel to said surface towards said photosensitive device, such that during scanning the overall length of the scanning beam remains constant.

2. In a copying machine according to claim 1, the improvement including a lens mounted on said carriage for focussing said scanning beam on to said photosensitive device.

3. In a copying machine according to claim 2 the improvement including the lens having a reduction factor of around 8 to 1.

4. In a copying machine according to claim 1, the improvement comprises having a CCD array as said photosensitive device.

5. In a copying machine according to claim 1, the improvement further comprising a printing head mounted on the carriage and electrically coupled to said photosensitive device, and a record medium supported on said machine adjacent said head.

* * * * *